(12) United States Patent
Ohtsu et al.

(10) Patent No.: US 8,611,047 B2
(45) Date of Patent: Dec. 17, 2013

(54) SERVO WRITER WITH CLOSELY SPACED LARGE-DIAMETER TAPE GUIDES SUPPORTED BY COMPRESSED AIR

(75) Inventors: Hiroki Ohtsu, Odawara (JP); Tatsuhiko Chokki, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 193 days.

(21) Appl. No.: 13/019,803

(22) Filed: Feb. 2, 2011

(65) Prior Publication Data

US 2011/0205659 A1    Aug. 25, 2011

(30) Foreign Application Priority Data

Feb. 23, 2010  (JP) .................................. 2010-036834

(51) Int. Cl.
*G11B 15/60* (2006.01)
(52) U.S. Cl.
USPC ..................... 360/130.21; 360/90; 360/96.1
(58) Field of Classification Search
USPC ................ 360/130.21, 90, 93, 95, 96.1
See application file for complete search history.

(56) References Cited

U.S. PATENT DOCUMENTS

| | | | |
|---|---|---|---|
| 6,116,535 A * | 9/2000 | Selg et al. ..................... | 360/132 |
| 6,550,658 B2 | 4/2003 | Fraberger | |
| 7,623,310 B2 | 11/2009 | Nakao | |
| 2001/0023885 A1 | 9/2001 | Fraberger | |
| 2002/0149866 A1 * | 10/2002 | Kato et al. ..................... | 360/13 |
| 2003/0016467 A1 * | 1/2003 | Bui et al. ..................... | 360/77.12 |
| 2003/0029952 A1 * | 2/2003 | Poorman ..................... | 242/346.2 |
| 2003/0048583 A1 * | 3/2003 | Tanaka ..................... | 360/130.21 |
| 2005/0207062 A1 | 9/2005 | Johnson | |
| 2006/0152846 A1 * | 7/2006 | Tsutsui ..................... | 360/95 |
| 2007/0285840 A1 * | 12/2007 | Kitamura ..................... | 360/134 |
| 2008/0068753 A1 * | 3/2008 | Biskeborn et al. ..................... | 360/130.21 |

FOREIGN PATENT DOCUMENTS

| | | |
|---|---|---|
| JP | 63173778 U | 11/1988 |
| JP | 06103656 A | 4/1994 |
| JP | 07057352 A | 3/1995 |
| JP | 2003523594 A | 8/2003 |
| JP | 2005-327386 A | 11/2005 |
| JP | 2007-287238 A | 11/2007 |
| JP | 2009015965 A | 1/2009 |

OTHER PUBLICATIONS

Notification of Reasons for Refusal, dated Jul. 9, 2013, issued in corresponding JP Application No. 2010-036834, 8 pages in English and Japanese.

* cited by examiner

*Primary Examiner* — Craig A. Renner
(74) *Attorney, Agent, or Firm* — Sughrue Mion, PLLC (57) ABSTRACT

In a servo writer, a write signal generator circuit is configured to output a signal for writing a servo signal to a servo write head disposed to allow a magnetic tape to slidably contact therewith and configured to write the servo signal thereon, and a plurality of tape guides are configured to guide the magnetic tape supplied from a supply reel to the servo write head and to a take-up reel. The plurality of tape guides include a first tape guide disposed to contact with the magnetic tape at a position directly upstream of the servo write head and a second tape guide disposed to contact with the magnetic tape at a position directly downstream of the servo write head. Each of the first and second tape guides includes a guide roller rotatably supported by an air bearing and having a diameter of 19 mm or greater.

10 Claims, 6 Drawing Sheets

SERVO WRITER WITH CLOSELY SPACED LARGE-DIAMETER TAPE GUIDES SUPPORTED BY COMPRESSED AIR

CROSS-REFERENCE TO RELATED APPLICATION(S)

This application claims the foreign priority benefit under Title 35, United States Code, §119 (a)-(d), of Japanese Patent Application No. 2010-036834, filed on Feb. 23, 2010 in the Japan Patent Office, the disclosure of which is herein incorporated by reference in its entirety.

BACKGROUND

1. Field

The present invention relates generally to a servo writer and a method for manufacturing a magnetic tape with a servo signal written thereon.

2. Description of Related Art

The magnetic tape on which digital data are recordable along its data tracks designed to have as narrow widths as possible to increase its recording density is provided with a servo signal written thereon in advance for use in the tracking control over a magnetic head so that the magnetic head can follow the narrow tracks. The servo signal is written on the magnetic tape by an apparatus called servo writer when the magnetic tape is manufactured in the factory (see U.S. Pat. No. 7,623,310 B2 corresponding to JP 2005-327386 A).

The servo signal serves to provide a reference to be used to locate the track positions on the magnetic tape, and thus should be written precisely in position (substantially without meandering or deviation in a tape width direction) along the length of the magnetic tape. In the magnetic tape drive, during recording or retrieving data, the magnetic head reads the servo signal to detect an amount of deviation of a track currently to be scanned for recording or retrieving the data with respect to the position of the magnetic head, and the magnetic head is moved to follow the tracks based on the detected amount of deviation; however, if the servo signal written in advance on the magnetic tape had already deviated too much in the tape width direction, the magnetic head would be unable to follow the tracks, whereby a tracking error would occur.

In order to write a servo signal precisely along the length of the magnetic tape, the servo writer typically uses a high-precision magnetic transport device which allows only a moderate amount of oscillation (deviation) of the magnetic tape in the tape width direction, and writes the servo signal on the magnetic tape by a fixed servo write head. As is generally known, it is important to figure out how to guide a magnetic tape at positions near a servo write head in order to minimize the lateral movement (oscillation) of the magnetic tape near the servo write head. To achieve this, a tape guide having a fixed cylindrical surface partially utilized as a tape guide surface may be adopted as disclosed in U.S. Pat. No. 7,623,310 B2 and JP 2007-287238 A, instead of a roller type tape guide (guide roller). In this case where a fixed cylindrical surface is partially utilized as a tape guide surface, a position error signal or PES (an indicator of the oscillation or deviation of a magnetic tape in the tape width direction) was evaluated to fall within a range of 150 to 250 nm.

SUMMARY

A study conducted by the inventors and their colleagues has shown that the use of a guide roller rotatably supported by an air bearing as a tape guide provided at two positions directly upstream and directly downstream (with respect to the tape transport direction) of a servo write head would possibly achieve the transport of a magnetic tape with precision higher than that which could be achieved through the use of a fixed tape guide as disclosed in U.S. Pat. No. 7,623,310 B2 and JP 2007-287238 A.

It is one aspect of the present invention to provide a servo writer which can write a servo signal with increased precision by causing a magnetic tape to be transported with increased rectilinearity, and to provide a magnetic tape with such a high-precision servo signal written thereon.

More specifically, in an apparatus aspect of the present invention, there is provided a servo writer which comprises a servo write head, a write signal generator circuit, a supply device, a take-up device and a plurality of tape guides. The servo write head is disposed to allow a magnetic tape to slidably contact therewith and configured to write a servo signal on the magnetic tape. The write signal generator circuit is configured to output a signal for writing a servo signal to the servo write head. The supply device is configured to supply the magnetic tape from a supply reel. The take-up device is configured to take up the magnetic tape supplied from the supply reel onto a take-up reel. The plurality of tape guides is configured to guide the magnetic tape supplied from the supply reel to the servo write head and to the take-up reel. The plurality of tape guides includes a first tape guide disposed to contact with the magnetic tape at a position directly upstream of the servo write head and a second tape guide disposed to contact with the magnetic tape at a position directly downstream of the servo write head. Each of the first and second tape guides includes a guide roller rotatably supported by an air bearing and having a diameter of 19 mm or greater.

The servo signal written by the servo writer configured as described above can be of a good quality such that a PES observed in a magnetic tape drive can be lowered, in that the oscillations associated with the rotations of the first and second tape guides of the servo writer, particularly the frequency components ranging from the fundamental through the third harmonic, can be attenuated.

The guide roller of each of the first and second tape guides may have a diameter of 26 mm or greater.

If the diameter of the guide roller of each of the first and second tape guides is increased to 26 mm or greater, the oscillations associated with the rotations of the first and second tape guides, particularly the frequency components ranging from the fundamental through the fourth harmonic, can be attenuated.

The guide roller of each of the first and second tape guides may have a diameter of 32 mm or greater.

If the diameter of the guide roller of each of the first and second tape guides is increased to 32 mm or greater, the oscillations associated with the rotations of the first and second tape guides, particularly the frequency components ranging from the fundamental through the fifth harmonic, can be attenuated.

The diameter (of the guide roller of each of the first and second tape guides) as mentioned in this specification refers to the diameter of a tape guide surface of each tape guide.

In any of the servo writers described above, the first tape guide may have a diameter different from that of the guide roller of the second tape guide.

If the guide rollers of the first tape guide and the second tape guide are designed to have the same diameter, a long-period oscillation may possibly occur to the magnetic tape due to a very small difference (inevitable difference) between the diameters of the guide rollers of the first and second tape guides, and adjustments to remove such a long-period oscillation is extremely difficult. In contrast, if the diameters of the guide rollers of the first and second tape guides are intentionally designed to have diameters different from each other, an oscillation due to the difference between the diameters has a shorter period, and thus adjustments to remove this oscillation can be made more easily.

In any of the servo writers described above, the guide roller of each of the first and second tape guides may have a tape guide surface provided with a spiral groove.

The use of such grooved tape guides can improve the trackability of the guide rollers following the magnetic tape, and the advantages of the present invention can be enhanced.

In any of the servo writers described above, preferably but not necessarily, runout of a rotating tape guide surface of each of the first and second tape guides (hereinafter referred to as "amount of center deviation") may be not more than 5 micrometers.

Any of the servo writers described above may be further configured such that each of the first and second tape guides further includes two roller restricting members fixed relative to the servo write head, the guide roller of each of the first and second tape guides includes a cylindrical portion having an axis oriented in a tape width direction and flanges provided at both axial ends of the cylindrical portion, the cylindrical portion and the flanges are integrally rotatable on the air bearing, each of the roller restricting members of each of the first and second tape guides is provided at an outside in the tape width direction of a corresponding flange of each of the first and second tape guides, and each roller restricting member is made of a material different from that which the corresponding flange is made of.

With this configuration, in which the roller restricting member is made of a material different from that which the corresponding flange is made of, the coefficient of friction between the roller restricting member and the corresponding flange can be made smaller so that the trackability of the guide roller following the magnetic tape can be improved and thus the advantages of the present invention can be enhanced.

In a method aspect of the present invention, a method for manufacturing a magnetic tape with a servo signal written thereon is provided. This method comprises: providing a servo writer as described above; setting a magnetic tape in the servo writer; and writing the servo signal on the magnetic tape using the servo writer. A magnetic tape manufactured by this method using any of the servo writers described above has a servo signal which has been written while the magnetic tape is being transported with its rectilinearity maintained properly and thus recorded with high precision, so that the magnetic tape can be designed to have narrower track widths.

BRIEF DESCRIPTION OF THE DRAWINGS

The above aspects and advantages, other advantages and further features of the present invention will become more apparent by describing in detail illustrative, non-limiting embodiments thereof with reference to the accompanying drawings, in which.

DETAILED DESCRIPTION OF THE EMBODIMENTS

Figure 1:
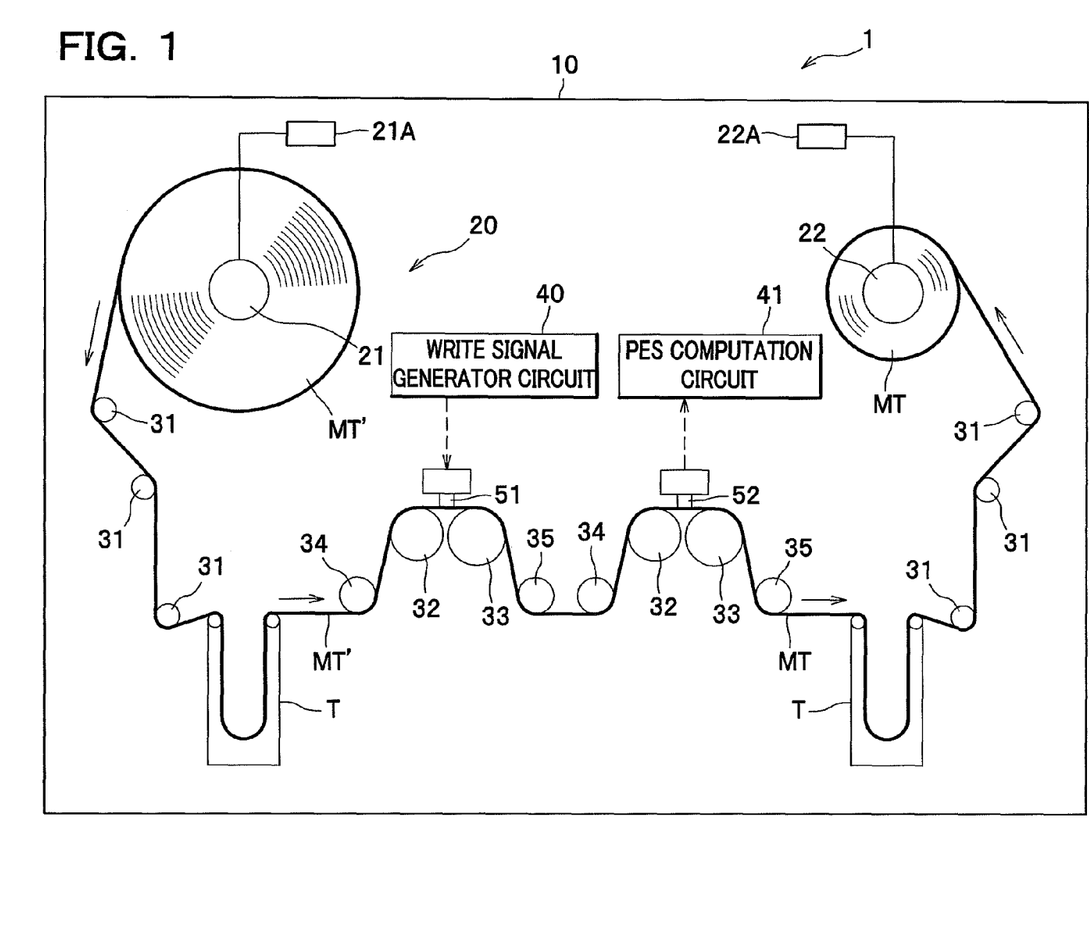
FIG. 1 is a general schematic diagram of a servo writer.

A detailed description will be given of an illustrative embodiment of the present invention with reference to the drawings. As shown in FIG. 1, a servo writer 1 includes a magnetic tape transport system 20 and a servo write head 51 which are arranged appropriately on a base 10. A write signal generator circuit 40 configured to generate a pulse signal for use in writing a servo signal in the servo write head 51 is connected to the servo write head 51. The servo write head 51 receives the pulse signal generated by the write signal generator circuit 40 and writes a servo signal (in this embodiment, the servo signal is not an electric signal but refers to a magnetic pattern arranged with a predetermined pitch in a longitudinal direction of a magnetic tape) on a magnetic tape.

The magnetic tape transport system 20 includes a plurality of tape guides 31-35 configured to guide a magnetic tape supplied from a supply reel 21 to the servo write head 51 and to a take-up reel 22. The magnetic tape MT' which has not yet had a servo signal written thereon is wound around the supply reel 21. The magnetic tape MT which has already had a servo signal written thereon is taken up around the take-up reel 22. The plurality of tape guides 31-35 are arranged to cause the magnetic tape MT', MT to move across (or slide along) the servo write head 51, and then across a verification head 52, between the supply reel 21 and the take-up reel 22. The magnetic tape transport system further includes tensioners T with which tension of the magnetic tape MT', MT being transported can be adjusted and maintained.

The supply reel 21 is connected to a rotation shaft of a motor 21A which constitutes a supply device configured to supply the magnetic tape MT' from the supply reel 21. The take-up reel 22 is connected to a rotation shaft of a motor 22A which constitutes a take-up device configured to take up the magnetic tape MT with a servo signal written thereon onto the take-up reel 22.

The servo write head 51 is shaped generally like a plate, and has a magnetic gap provided on its surface across which the magnetic tape MT' moves. The magnetic gap is formed by a non-magnetic material and shaped in a servo pattern. The servo pattern may be, though not illustrated, for example, a pattern consisting of a set of nonparallel stripes as disclosed in U.S. Pat. No. 7,623,310 B2.

The verification head 52 is a read head for verifying the quality of a servo signal written on the magnetic tape MT. In this embodiment, the verification head 52 is a magnetic head having one or more readout elements (not shown) which or each of which is located in a position corresponding to the position of the servo pattern (position in the direction of the width of the magnetic tape), like a magnetic read head provided in a magnetic tape drive of a type known in the art.

A PES computation circuit 41 as known in the art is connected to the verification head 52. The PES computation circuit 41 is configured to derive a PES as the quality of a servo signal (servo pattern written on the magnetic tape) from an electric signal obtained from readout of the servo pattern by the verification head 52. The PES computation circuit 41 calculates a lateral shift of the magnetic tape MT from an input electric signal (pulsed signal), and subjects the resulting signal of time-varying lateral tape shift amount to an actuator response filter (i.e., Closed-Loop Simulation as defined in the LTO standard) in order to obtain a PES. The PES is evaluated with a value (nm) of 1σ (σ is a standard deviation) of intensity distribution of the signal obtained by subjecting the signal to the actuator response filter.

The actuator response as used above in obtaining the PES is a servo response characteristic of a magnetic head provided in a magnetic tape drive. Aside from the characteristics of servo actuators provided in individual magnetic tape drives, one characteristic of a particular actuator is defined as a reference for evaluation of the quality of the magnetic tape. The actuator response exhibits a negative gain for components of the oscillation at lower frequencies and a zero or positive gain for components of the oscillation at higher frequencies. That is, with this hypothetical actuator, a component of the input signal having a frequency lower than a predetermined frequency can be attenuated, though a component of the input signal having a frequency higher than or equal to the predetermined frequency can hardly be attenuated or can be slightly amplified. The frequency, in this context, is a frequency per unit length of the magnetic tape, and thus not influenced by the transport speed of the magnetic tape.

The servo write head 51 has a magnetic tape sliding surface oriented downward, and the magnetic tape MT', MT is wrapped around the tape guides 32, 33 with its underside (the reverse side opposite to its magnetic layer side) supported by the tape guides 32, 33 so that the upper side (the magnetic layer side) of the magnetic tape MT', MT is slidably in contact with the sliding surface of the servo write head 51. The tape guide 32 is a first tape guide disposed to contact with the magnetic tape MT' at a position directly upstream of the servo write head as viewed with respect to the direction of transport of the magnetic tape MT', MT. The tape guide 33 is a second tape guide disposed to contact with the magnetic tape MT at a position to directly downstream of the servo write head as viewed with respect to the direction of transport of the magnetic tape MT', MT.

A tape guide 34 configured to guide the magnetic tape MT' at a position further upstream of the tape guide 32 is disposed at a lower and left-side position relative to the tape guide 32. A tape guide 35 configured to guide the magnetic tape MT at a position further downstream of the tape guide 33 is disposed at a lower and right-side position relative to the tape guide 33.

The tape guides 32-35 each configured to include a guide roller (roller portion 103 which will be described later) rotatably supported by an air bearing have the same construction except that they have tape guide surfaces different in diameter. Therefore, a detailed description of the construction will be given in conjunction with the tape guide 32.

Figure 2:
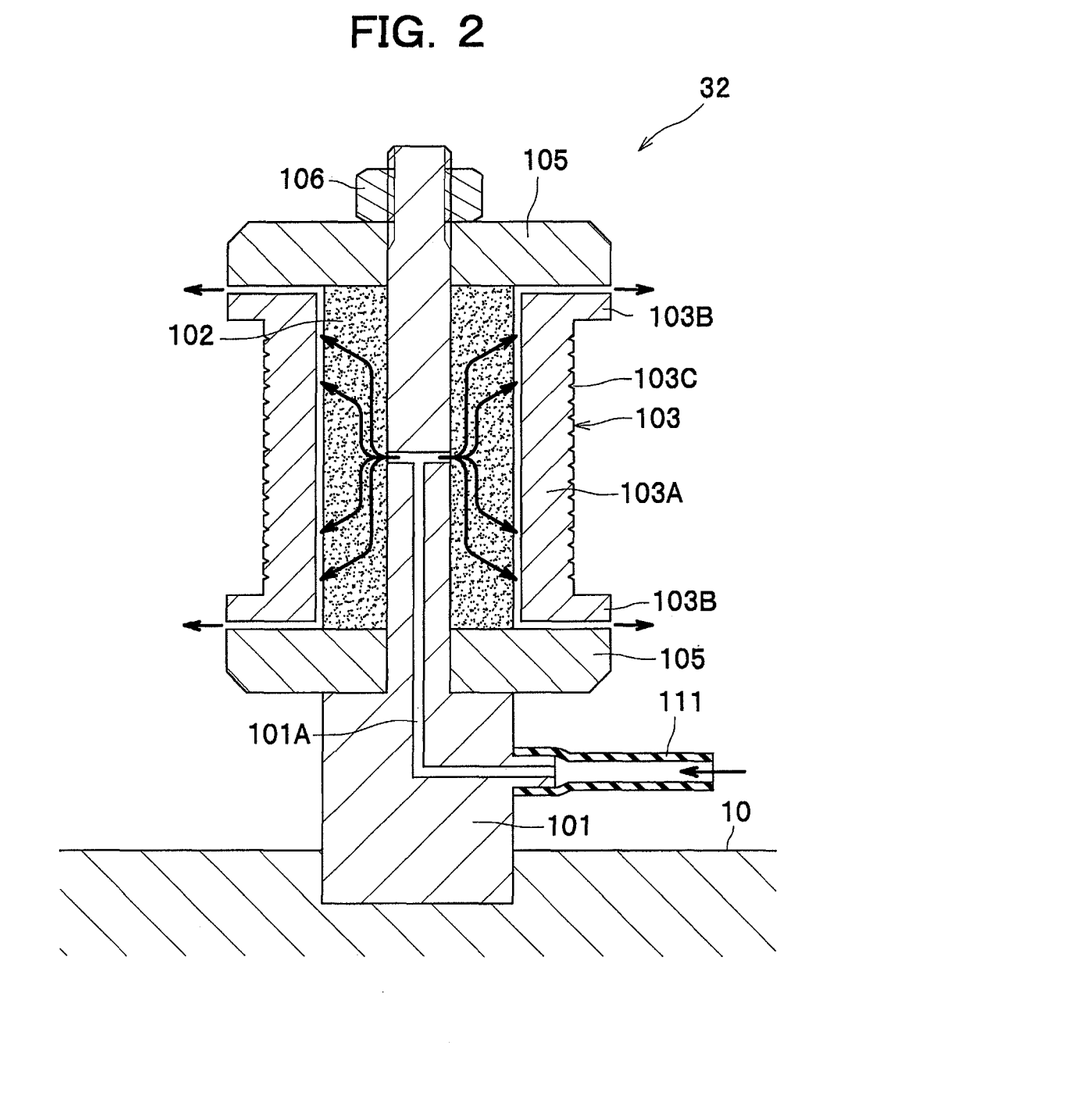
FIG. 2 is a sectional view of a tape guide including an air-bearing guide roller.

As shown in sectional view of FIG. 2, the tape guide 32 includes a support shaft 101 fixed on the base 10, a porous roller support portion 102 supported on the support shaft 101, a roller portion 103 (guide roller) rotatably fitted on an outside of the roller support portion 102, and roller restricting members 105 disposed to restrict the movement of the roller portion 103 in its axial direction.

The support shaft 101 is made of stainless steel, or the like. The support shaft 101 includes a base portion at which it is fixed on the base 10, and a shaft portion around which the roller support portion 102 is provided. An air passage 101A is formed inside the support shaft 101, so that air introduced from an inlet provided at the base portion of the support shaft 101 passes through the air passage 101A and is discharged from outlets provided at the shaft portion of the support shaft 101. To the inlet of the air passage 101A, a hose 111 is connected, through which compressed air is supplied. The outlets of the air passage 101A are disposed at the periphery of the shaft portion of the support shaft 101 facing to the roller support portion 102.

The roller support portion 102 is a porous cylindrical member made of a material such as ceramics, carbon, stainless steel and the like. The inner cylindrical surface of the roller support portion 102 is disposed to face to the outlets of the air passage 101A of the support shaft 101. That is, the support shaft 101 is disposed inside the roller support portion 102.

The roller portion 103 is rotatably fitted on the outside of the roller support portion 102. The roller portion 103 is made of stainless steel, or the like, and includes a cylinder portion 103A having an outer cylindrical surface serving as a tape guide surface, and flanges 103B provided at upper and lower ends of the cylinder portion 103A as viewed in FIG. 2. The tape guide surface has a helically extending narrow groove 103C formed thereon as disclosed in JP 2007-287238 A. With this helically extending groove 103C, air between the tape guide surface and the magnetic tape MT that is in contact with the tape guide surface is readily let out so that stable contact of the magnetic tape MT with the tape guide surface is achieved with increased reliability. This ensures that the roller portion 103 can smoothly follow the running magnetic tape MT. Furthermore, the helical arrangement of the groove 103 on the tape guide surface causes the magnetic tape MT to be biased or pushed with a very small force toward one of the upper and lower ends (e.g., the lower end) in FIG. 2. Accordingly, the magnetic tape MT tends to come in contact with the flange 103B at its lower side, and the lateral or widthwise shift of the magnetic tape MT' (shift in the position of the running magnetic tape MT' in the direction of the width of the magnetic tape MT') is restricted, so that the oscillation of the running magnetic tape MT' in the tape width direction can be restricted.

At an upper and lower ends of the roller portion 103 (outside of the flange 103B) in FIG. 2, i.e., at the both outer sides of the roller portion 103 in the tape width direction, roller restricting members 105 each having a diameter substantially equal to those of the flanges 103B are provided. The support shaft 101 is pierced through these two roller restricting members 105 and the roller support portion 102, and the roller restricting members 105 are fixed on the support shaft 101 with a nut 106 screwed on the threaded upper end portion of the support shaft 101. Each roller restricting member 105 is made of a material different from that of the roller portion 103, for example, ceramics such as alumina, zirconia, etc., or resins. With this selection of materials, any blemish which could be added by dust caught between the roller portion 103 and the roller restricting members 105 would not spread; therefore, the durability of the roller portion 103 and the roller restricting members 105 can be increased. In particular, if the roller restricting members 105 are made of a material softer than that of the roller portion 103, the roller portion 103 is unlikely to be damaged. When the roller restricting member 105 is damaged, the roller restricting member 105 may be replaced while the roller portion 103 may be used continuously, so that the more precisely fabricated roller portion 103 can be used for a longer period of time.

A clearance such that air supplied from the air passage 101A and released into the roller support portion 102 can slowly flow therethrough is left between the outer cylindrical surface of the roller support portion 102 and the inner cylindrical surface of the roller portion 103. Similarly, a clearance such that air having passed through the clearance between the outer cylindrical surface of the roller support portion 102 and the inner cylindrical surface of the roller portion 103 can be released out therethrough is left between each flange 103 and the roller restricting member 105 adjacent thereto. With this configuration, the roller portion 103 with air thus always retained between the roller support portion 102 and itself and between each roller restricting member 105 and itself can be caused to very smoothly and stably rotate about an axis common to the coincident axes of the support shaft 101 and the roller support portion 102.

Figure 3:
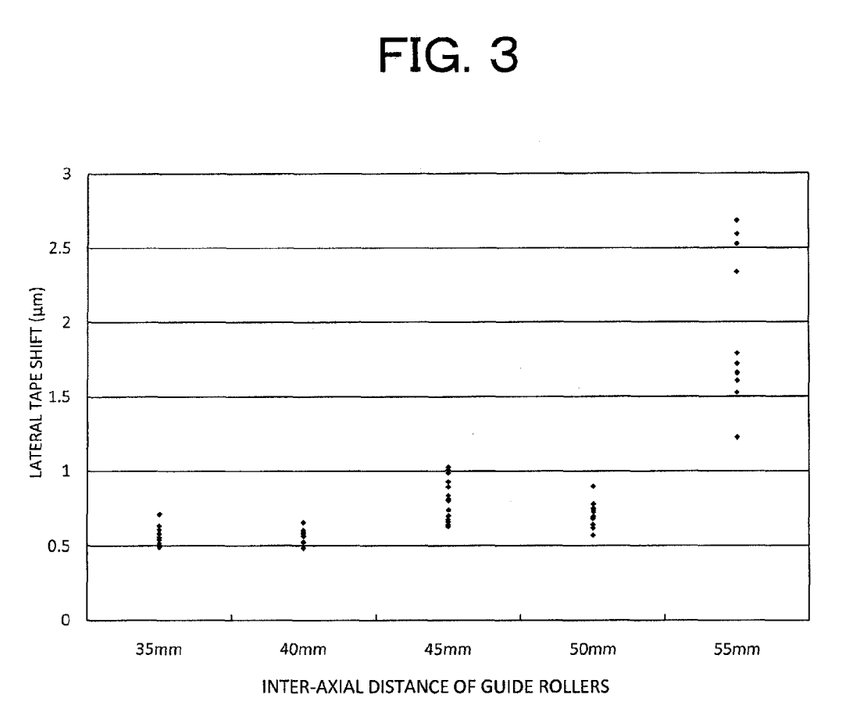
FIG. 3 is a graph showing a relationship between an interaxial distance of guide rollers and a lateral shift of a magnetic tape.

The roller portion 103 (guide roller) of each of the tape guides 32, 33 in the present embodiment has a diameter (as measured at its tape guide surface) of 19 mm or greater. The diameter of the roller portion 103 of each of the tape guides 32, 33 is preferably 26 mm or greater, and more preferably 32 mm or greater. As will be described later, the larger the diameter of the roller portion 103, the lower the frequency of oscillation associated with rotation of the roller portion 103 becomes. Therefore, by increasing the diameter of the roller portion 103, the PES can be lowered. The upper limit of the diameters applicable to the roller portion 103 of each of the tape guides 32, 33 may not be strictly defined, but restricted by an inter-axial distance of the guide rollers (i.e., distance between the axes of the roller portions 103 of the tape guides 32, 33), because too long distance between the tape guides 32, 33 would require an excessively long portion of the magnetic tape MT MT to be wrapped around the tape guides 32, 33, making the transport of this portion of the magnetic tape MT', MT unstable. FIG. 3 is a graph representing the shift of the running magnetic tape in its tape width direction which was obtained from a servo signal retrieved by the verification head 52 of the servo writer 1 for each of several inter-axial distances of the guide rollers (the distance the magnetic tape wrapped therearound traverses between the roller portions 103 of the tape guides 32, 33). In this simulation, the diameters of the guide rollers (roller portions 103 of the tape guides 32, 33) used were 16 mm. As shown in FIG. 3, the greater the distance between the guide rollers, the greater the shift amount of the magnetic tape in the tape width direction became. It has however been shown that the shift amount of the magnetic tape gradually increased through the inter-axial distance of 50 mm, while the shift amount abruptly changed at the inter-axial distance of 55 mm. From these results, it is understood that the inter-axial distance between the guide rollers may be preferably 50 mm or less, and more preferably 35 mm or less.

The diameters of the guide rollers (roller portions 103 of the tape guides 32, 33) may be set with consideration given to the clearance of several millimeters (e.g., not more than the size of the servo write head in the longitudinal direction of the magnetic tape) to be kept between the tape guide 32 and the tape guide 33. Therefore, the upper limit of the diameters of the guide rollers (of the tape guides 32, 33) may, for example, be 50 mm or so in the case where the inter-axial distance is 50 mm, and 35 mm or so in the case where the inter-axial distance is 35 mm.

The roller portions 103 of the tape guides 32, 33 may be designed to have the same diameter, but preferably designed to have diameters several millimeters or so different from each other. If the diameters of the roller portions 103 of the tape guides 32, 33 are set at the same value, the actual diameters of the tape guides 32, 33 in the finished product could become slightly different (on the order of several micrometers). As a result, the oscillations of the roller portions 103 of the tape guides 32, 33 would overlap and produce a very long period of oscillation, which would be very difficult to adjust (eliminate). With this in view, the diameters of the roller portions 103 of the tape guides 32, 33 are set at different values on the order of several millimeters in this embodiment, so that a long-period of oscillation produced by overlapping of the oscillations of the roller portions 103 of the tape guides 32, 33 should become an oscillation of a period (frequency) within an easily adjustable range. Accordingly, the setting of the servo writer 1 can be carried out smoothly and quickly; thus, the productivity is increased. The adjustments to eliminate such a long-period oscillation may be made, for example, by changing the height and/or angle of the tape guides 32, 33 with respect to the base 10 to change the condition of contact of the flange 103B with the magnetic tape MT', MT.

In the present embodiment, the inter-axial distance between the guide rollers (the roller portions 103 of the tape guides 32, 33) are set at 35 mm. In a preferred example of combination in the settings, the roller portion 103 of the tape guide 32 may be designed to have a diameter of 32 mm, the roller portion 103 of the tape guide 32 may be designed to have a diameter of 35 mm, the roller portions 103 of the tape guide 34 disposed upstream of the tape guide 32 and the tape guide 35 disposed downstream of the tape guide 33 are designed to have a diameter of 16 mm. The smaller the amount of center deviation of the roller portion 103 of each of the tape guides 32, 33, the higher the rectilinearity in the transport of the magnetic tape MT', MT becomes. The amount of center deviation of the roller portion 103 of each of the tape guides 32, 33 is preferably not more than 5 micrometers, more preferably not more than 2 micrometers.

A description of the tape guides 32-35 has been provided above in conjunction with the four tape guides near the servo write head 51. In order to make the conditions for transport of the magnetic tape MT near the verification head 52 equivalent to those for transport of the magnetic tape MT', MT near the servo write head 51 writing a servo signal, similar tape guides having the same structure and arrangement as those of the servo write head 51 are provided near the verification head 52 (upstream and downstream of the verification head 52 as viewed with respect to the tape transport direction). These four tape guides for the verification head 52 are designated by the same reference numerals 32-35 in FIG. 1 and a duplicate description thereof is omitted herein.

The reason that the roller portions 103 (guide rollers) of the tape guides 32, 33 in this embodiment have relatively large diameters of 32 mm and 35 mm, respectively will now be described in detail.

Figure 4:
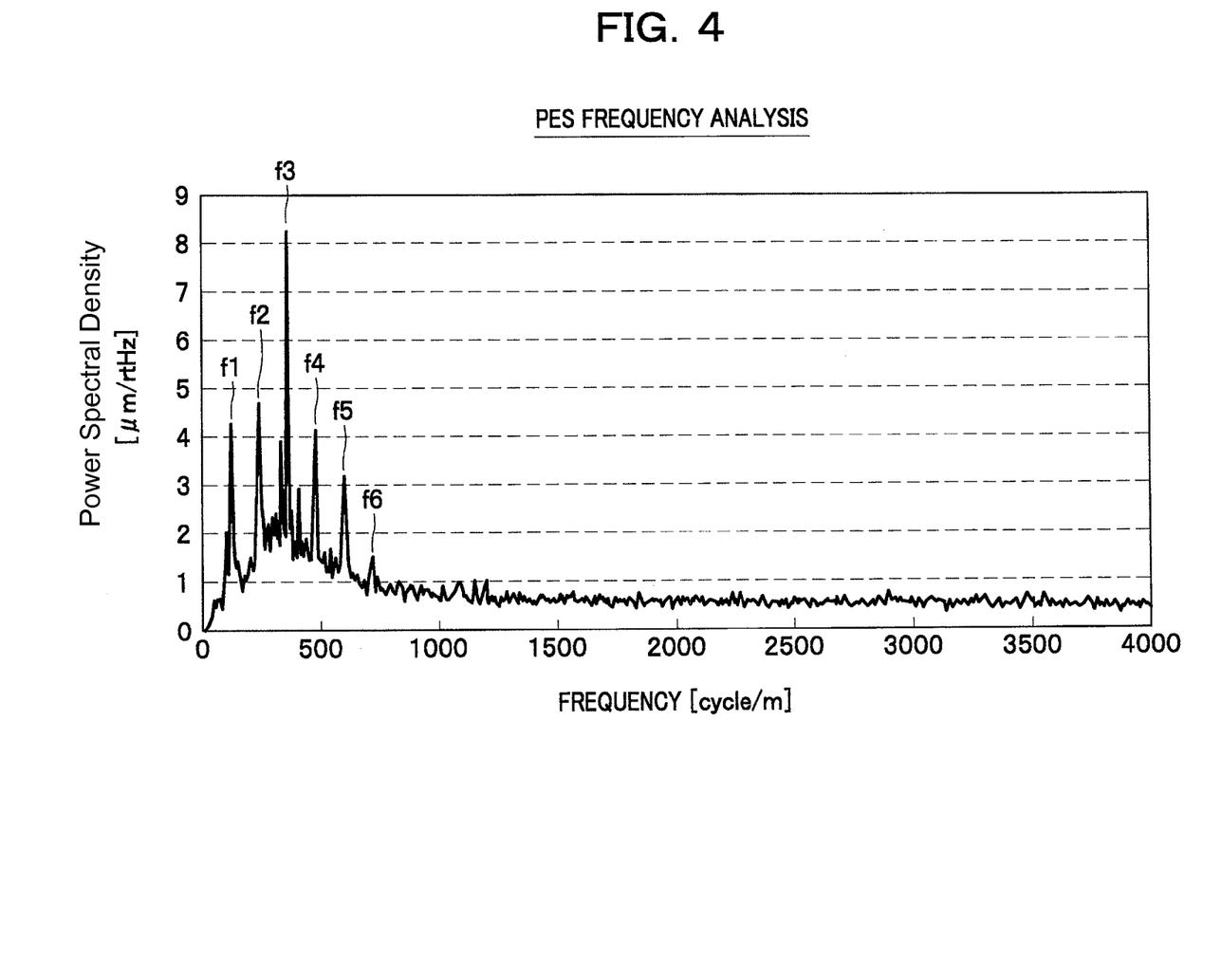
FIG. 4 is a graph showing the result of a frequency analysis of PES in a case where an air-bearing guide roller of 16 mm in diameter is used.

The inventors and their colleagues carried out a measurement of PES for a magnetic tape transported with guide rollers each supported rotatably by an air bearing. The diameter of each guide roller used in this measurement was 16 mm. The guide rollers were arranged at positions directly upstream and directly downstream of the servo write head. The results of frequency analysis of PES on the horizontal axis relative to PSD (power spectral density) on the vertical axis were shown in FIG. 4. The frequencies represented by the horizontal axis in FIG. 4 were frequencies per unit length of the magnetic tape with the unit indicating the frequency per 1-m length of the magnetic tape. As apparent from FIG. 4, the PES showed several peaks of oscillation in standard deviation at specific frequencies as indicated by f1-f6. Judging from the frequencies of these peaks f1-f6, the oscillations at the peaks f1-f6 were assumed to be the oscillations generated synchronously with rotation of the guide rollers. To be more specific, it was shown that the peak f1 represented the oscillation at the fundamental frequency corresponding to one cycle of the rotation of the guide rollers and the peaks f2-f6 represented the oscillation at the second-harmonic to sixth-harmonic frequencies, respectively, having twice to six times the fundamental frequency. The PES may be evaluated with a value of 1σ of amplitude distribution, as described above, and correspond to the area defined in the graph of the frequency analysis shown in FIG. 4. Therefore, it is to be appreciated that the PES can be reduced if the peaks f1-f6 are made smaller. It is estimated that the PES which would otherwise be evaluated to be 100 nm (as shown in FIG. 4) can be made smaller to 55 nm if the peaks f1-f6 can be removed from the results of experiment of FIG. 4.

The PES can be obtained by subjecting the amount of lateral shift of the running magnetic tape to an actuator response filter. As described above, the actuator response filter possesses the characteristic such that the lower-frequency component can be attenuated more. Therefore, the lateral shift (oscillation) at low frequencies can be followed by the actuator, and is thus unlikely to affect the PES value, while the lateral shift at high frequencies cannot be followed by the actuator and is thus likely to affect the PES value.

Figure 5:
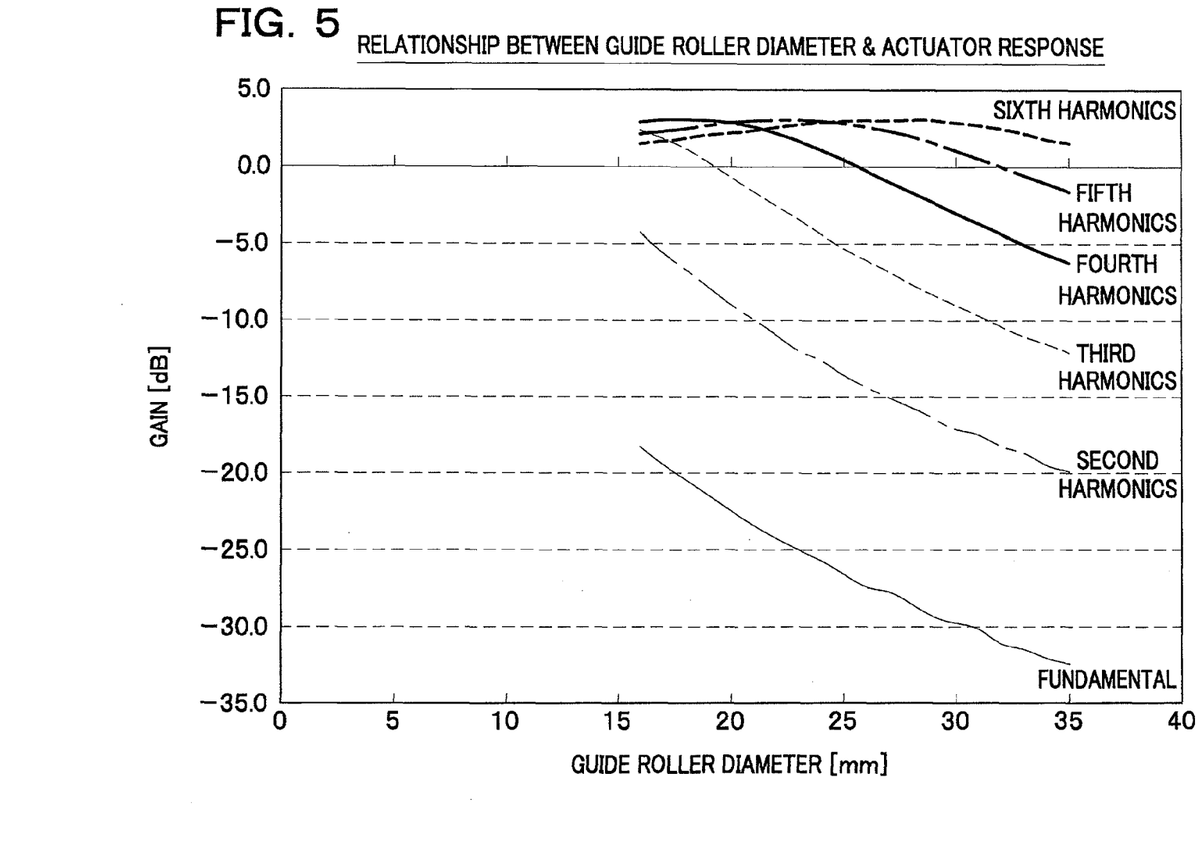
FIG. 5 is a graph showing gains derived by changing the diameter of the guide roller.

The inventors and their colleagues focused their attention on the phenomenon that a change can be effected in the frequency of the lateral shift of the magnetic tape by varying the diameter of the guide rollers (roller portions 103 of the tape guides 32, 33) for use in positions adjacent to the servo write head, and estimated how the actuator response filter attenuates the fundamental and second to sixth harmonics of the oscillation associated with rotation of the guide rollers. The results of this estimation are shown graphically in FIG. 5. FIG. 5 shows the relationship between the diameter of the guide rollers and the gain for each of the oscillation components of fundamental and second through sixth harmonics. As shown in FIG. 5, it appears evident that the fundamental and the second harmonic can be attenuated with the guide rollers having any of the diameters between 16 mm and 35 mm, whereas the third harmonic can be attenuated with the guide rollers having the diameters of 19 mm or larger, the fourth harmonic can be attenuated with the guide rollers having the diameters of 26 mm or larger, the fifth harmonic can be attenuated with the guide rollers having the diameters of 32 mm or larger, and none of these frequency components can be attenuated with the guide rollers having the diameters smaller than 19 mm.

Hence, it can be concluded that the larger the diameters of the guide rollers (roller portions 103 of the tape guides 32, 33), the oscillation components covering the higher-order harmonics of the running magnetic tape can be attenuated, and that the guide rollers having diameters of 19 mm or larger may be employed in order to attenuate the third harmonic, the guide rollers having diameters of 26 mm or larger may be employed in order to attenuate the third and fourth harmonics, and the guide rollers having diameters of 32 mm or larger may be employed in order to attenuate the third through fifth harmonics.

When a magnetic tape MT with a servo signal written thereon by a servo writer 1 configured as described above is manufactured, a magnetic tape MT' with no servo signal written thereon is transported and caused to slide across the servo write head 51, and a pulse signal for writing a servo signal is outputted by the write signal generator circuit 40 to the servo write head 51. The pulse signal inputted into the servo write head 51 causes the servo write head 51 to generate a leakage flux at the magnetic gap 39. The leakage flux then causes a change in magnetic moment on the magnetic recording layer of the magnetic tape MT so that a servo signal in the form of a servo pattern can be written on the magnetic recording layer of the magnetic tape MT'. Finally, the magnetic tape MT with a servo signal written thereon is taken up onto the take-up reel 22. If a servo signal is written on the magnetic tape MT' using a servo writer 1 having large-diameter guide rollers (roller portions 103 of the tape guides 32, 33) disposed directly upstream and downstream of the servo write head 51, the magnetic tape MT' can be transported with an extremely high rectilinearity, and thus a magnetic tape MT having a servo signal written with high precision can be obtained.

The above-discussed specific setting of the diameters of the guide rollers (of the tape guides 32, 35) disposed directly upstream and downstream of the servo write head 31 is a matter of importance particularly in cases where the guide rollers adopted are not those which are rotatably supported merely by a contact-type mechanical bearing but those which are rotatably supported by an air bearing as described above. It is to be understood that the guide rollers rotatably supported by such a contact-type mechanical bearing would permit a too large amount of oscillation in the tape guide surface such that adjustments of the diameters as in the present embodiment could not result in substantial improvement for reduction of PES.

Although the exemplary embodiment of the present invention has been described above, the present invention is not limited to this embodiment, and may be carried out into practice in various other ways. Thus, it is contemplated that various modifications and changes may be made to the exemplary embodiment of the invention without departing from the scope of the embodiment of the present invention as defined in the appended claims. For example, the specific structures and arrangements of the servo writer 1 have been described above merely in relation to the present invention, and the other members and/or devices not described above may be added optionally where appropriate.

EXAMPLES

Figure 6:
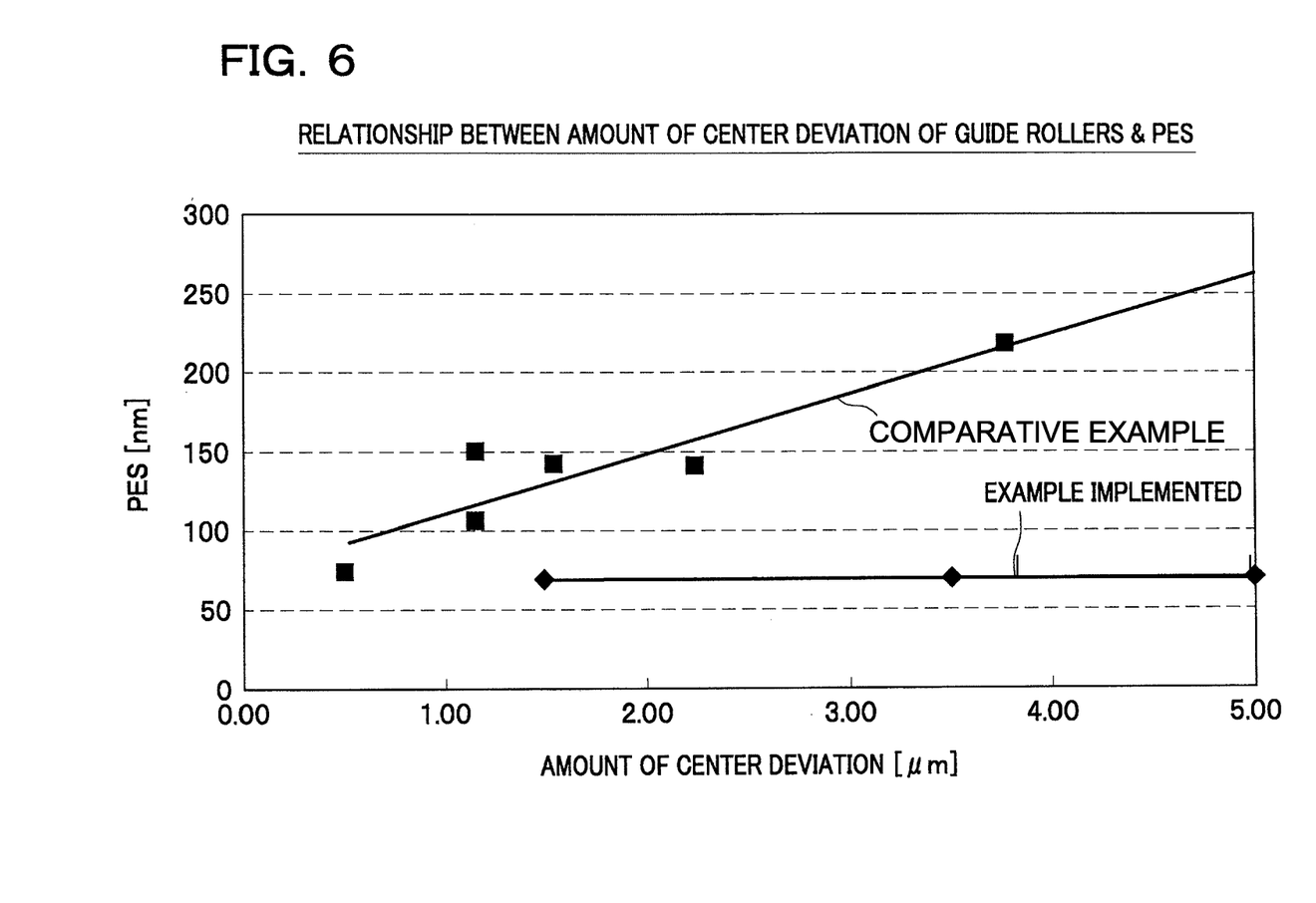
FIG. 6 is a graph showing a relationship between the amount of center deviation of the guide roller and the PES.

PES subject to variation in the diameters of the guide rollers was evaluated experimentally. FIG. 6 is a graph showing the relationship between the amount of center to deviation of the guide rollers and PES as evaluated. The amount of center deviation of the guide rollers is measured as runout of the rotating tape guide surface of each guide roller around which a magnetic tape being transported is wrapped. Based on the theory established by the inventors and their colleagues that the amount of center deviation influences the PES, a plurality of experiments were carried out using a plurality of guide rollers different from each other in the amount of center deviation. The same servo writer was used for each experiment. Two guide rollers adopted in each experiment for use in positions directly upstream and directly downstream of the servo write head, which correspond to the roller portions 103 of the tape guides 32, 33 according to the above-described embodiment, are selected among those which exhibit substantially the same amount of center deviation.

In FIG. 6, comparative example employs tape guides including guide rollers rotatably supported by air bearings (as tape guides disposed in positions directly upstream and directly downstream of the servo write head, which correspond to the tape guides 32, 33 of the above-described embodiment) and each guide roller has a diameter of 16 mm, while the examples implemented according to the above-described embodiment employ a tape guide 32 including a guide roller 103 having a diameter of 32 mm and a tape guide 33 including a guide roller 103 having a diameter of 35 mm.

To elaborate on the amount of center deviation as shown in FIG. 6, it is to be understood that the amount of center deviation of the precisely fabricated guide roller falls within 1-2 micrometers, and providing a guide roller exhibiting a center deviation less than 1 micrometer entails great difficulty and enormous cost of its fabrication.

As apparent from FIG. 6, in the comparative examples, the smaller the amount of center deviation, the smaller the PES as evaluated becomes, and the PES evaluated with the amount of deviation within 1-2 micrometers exhibits approximately 100-200 nm. In contrast, in the examples implemented according to the above-described embodiment, the PES as evaluated with varying amounts of center deviation does not exhibit much variation, and falls around 70 nm. In this way, it has been shown that the increase in the diameters of the guide rollers should be able to make PES smaller even when the guide rollers having the same amount, of center deviation are employed.

What is claimed is:

1. A servo writer comprising:
    a servo write head disposed to allow a magnetic tape to slidably contact therewith and configured to write a servo signal on the magnetic tape;
    a write signal generator circuit configured to output a signal for writing a servo signal to the servo write head;
    a supply device configured to supply the magnetic tape from a supply reel;
    a take-up device configured to take up the magnetic tape supplied from the supply reel onto a take-up reel; and
    a plurality of tape guides configured to guide the magnetic tape supplied from the supply reel to the servo write head and to the take-up reel, the plurality of tape guides including a first tape guide disposed to contact with the magnetic tape at a position directly upstream of the servo write head and a second tape guide disposed to contact with the magnetic tape at a position directly downstream of the servo write head, wherein each of the first and second tape guides includes a guide roller rotatably supported by an air bearing and having a diameter of 19 mm or greater,
    wherein each of the first and second tape guides further includes a roller support portion having an outer cylindrical surface,
    wherein the guide roller of each of the first and second tape guides includes a cylindrical portion of which an outer cylindrical surface provides a tape guide surface, and a clearance is provided between an inner cylindrical surface of the cylindrical portion of the guide roller and the outer cylindrical surface of the roller support portion, such that the cylindrical portion is rotatably supported by compressed air supplied into the clearance, and
    wherein the roller support portion is of a porous material, and the compressed air is supplied through the porous roller support portion into the clearance.

2. The servo writer according to claim 1, wherein the guide roller of each of the first and second tape guides has a diameter of 26 mm or greater.

3. The servo writer according to claim 1, wherein the guide roller of each of the first and second tape guides has a diameter of 32 mm or greater.

4. The servo writer according to claim 1, wherein the guide roller of the first tape guide has a diameter different from that of the guide roller of the second tape guide.

5. The servo writer according to claim 1, wherein the guide roller of each of the first and second tape guides has a tape guide surface provided with a spiral groove.

6. The servo writer according to claim 1, wherein runout of a rotating tape guide surface of each of the first and second tape guides is not more than 5 micrometers.

7. The servo writer according to claim 1, wherein each of the first and second tape guides further includes two roller restricting members fixed relative to the servo write head, the cylindrical portion of the guide roller of each of the first and second tape guides has an axis oriented in a tape width direction, flanges are provided at both axial ends of the cylindrical portion, the cylindrical portion and the flanges are integrally rotatable on the air bearing, each of the roller restricting members of each of the first and second tape guides is provided at an outside in the tape width direction of a corresponding flange of each of the first and second tape guides, and each roller restricting member is made of a material different from that which the corresponding flange is made of.

8. The servo writer according to claim 1, wherein the first and second tape guides are located adjacent to each other with a clearance left therebetween smaller than a size of the servo write head in a direction of transport of the magnetic tape.

9. A method for manufacturing a magnetic tape with a servo signal written thereon, comprising:
    providing a servo writer according to claim 1;
    setting a magnetic tape in the servo writer; and
    writing the servo signal on the magnetic tape using the servo writer.

10. The servo writer according to claim 1, wherein the guide roller further includes flanges provided integrally at both axial ends of the cylindrical portion and configured to be rotatable together with the cylindrical portion on the air bearing, and
    wherein each of the first and second tape guides further includes roller restricting members provided at axially outer ends of the flanges, and the compressed air supplied into the clearance is released through a clearance formed between each flange and a corresponding roller restricting member to outside.

* * * * *